(12) United States Patent
Xu et al.

(10) Patent No.: US 11,559,890 B2
(45) Date of Patent: Jan. 24, 2023

(54) METHOD, APPARATUS AND SYSTEM FOR DETERMINING A TRAJECTORY OF A ROBOT'S END EFFECTOR

(71) Applicant: Siemens Aktiengesellschaft, Munich (DE)

(72) Inventors: Wen Kang Xu, Munich (DE); Jian Qiang Wu, Shanghai (CN); Yue Zhuo, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 16/449,524

(22) Filed: Jun. 24, 2019

(65) Prior Publication Data

US 2019/0389063 A1  Dec. 26, 2019

(30) Foreign Application Priority Data

Jun. 25, 2018 (EP) ..................................... 18179535

(51) Int. Cl.
*B25J 9/16* (2006.01)

(52) U.S. Cl.
CPC ........... *B25J 9/1653* (2013.01); *B25J 9/1666* (2013.01)

(58) Field of Classification Search
CPC . B25J 9/16; B25J 9/1628; B25J 9/1653; B25J 9/1656; B25J 9/1664; B25J 9/1666; B25J 9/1674; B25J 9/1676; G05B 2219/49147; G05B 2219/50108; G05B 2219/50109; G05B 19/4061
See application file for complete search history.

(56) References Cited

U.S. PATENT DOCUMENTS

2015/0148958 A1* 5/2015 Primessnig ............ B25J 9/1676
700/255
2016/0016311 A1  1/2016 Konolige et al.

FOREIGN PATENT DOCUMENTS

| CN | 106625671 A | 5/2017 |
| CN | 106660207 A | 5/2017 |

OTHER PUBLICATIONS

Alin Albu-Schaffer, Cartesian Impedance Control Techniques for Torque Controlled Light-Weight Robots, 2002, IEEE (Year: 2002).*
"Jinjun Xia, Collision Detection of Flexible Joint Manipulator by Using Joint Torque Sensors, 2009, IEEE" (Year: 2009).*

(Continued)

*Primary Examiner* — Khoi H Tran
*Assistant Examiner* — Sarah A Tran
(74) *Attorney, Agent, or Firm* — Harness, Dickey & Pierce, P.L.C.

(57) ABSTRACT

A method and apparatus for determining a trajectory of a robot's end effector are disclosed. In an embodiment, the apparatus includes a force obtaining device to obtain a collision force of the end effector of the robot, caused by a collision of the end effector upon the collision being detected; and a trajectory determining device to determine a second trajectory of the end effector based on the collision force of the end effector obtained, and based on a recorded first trajectory of the end effector. The recorded first trajectory is a trajectory recorded before the collision, and the second trajectory is a trajectory determined after the collision. As such, an efficient protection for the robot and its working environment at the moment of collision may be achieved.

7 Claims, 7 Drawing Sheets

(56) References Cited

OTHER PUBLICATIONS

Neville Hogan: "Impedance Control: An Approach to Manipulation". A Journal of Dynamic Systems, Measurement, and Control, Mar. 1, 1985(Mar. 1, 1985); XP055146122; 001: 10.1115/1.3140702 Retrieved from the Internet: URL:http://dynamlcsystems.asmedigitalcollection.asme.org/article.aspx?articleid=I403621.

Ye Bosheng et al: "A Study of Force and Position Tracking Control for Rabat Contact with an Arbitrarily Inclined Plane", International Journal of Advanced Robotic Systems, vol. 10. No. 1, Jan. 1, 2013 {Jan. 1, 2013). pp. 69, XP055527413, CR ISSN: 1729-8814, DOI: 10.5772/55086.

Jianbin H et al.: "Adaptive Impedance-controlled Manipulator Based on Collision Detection", Chinese Journal of Aeronautics, Elsevier, Amsterdam, NL; vol. 22. No. 1; Feb. 1, 2009 (Feb. 1, 2009), pp. 105-112, XP025995757; ISSN: 1000-9361, DOI 10.1016/51000-9361(08)60075-8.

Extended European Search Report dated Dec. 17, 2018.

European Office Action dated Oct. 15, 2021 issued in corresponding European Appln. No. 18179535.2.

L. Yuquan et al. 'Collision Position Sensing for Manipulator Using Force/Torque Sensor' *34th Chinese Control Conference*, 2015, pp. 5809-5814.

O. Sim et al. 'Collision Detection and Safe Reaction Algorithm for Non-backdrivable Manipulator with Single Force/Torque Sensor' *Journal of Intelligent and Robotic Systems*, vol. 91, No. 3, 2017, pp. 403-412.

C. Ott et al. 'Base Force/Torque Sensing for Position Based Cartesian Impedance Control' *IEEE/RSJ International Conference on Intelligent Robots and Systems*, 2009, pp. 3244-3250.

\* cited by examiner

METHOD, APPARATUS AND SYSTEM FOR DETERMINING A TRAJECTORY OF A ROBOT'S END EFFECTOR

PRIORITY STATEMENT

The present application hereby claims priority under 35 U.S.C. § 119 to European patent application number EP18179535.2 filed Jun. 25, 2018, the entire contents of which are hereby incorporated herein by reference.

FIELD

Embodiments of the invention are generally related to the robotic field, and more particularly relate to a method, apparatus and system for determining a trajectory of a robot's end effector.

BACKGROUND

With the advancement of robot technology, more and more industries have introduced industrial robots, such as six-axis industrial robots. In the field of industrial robots, in order to achieve a high work efficiency, the robot's moving speed is usually relatively fast, and thus the robot easily collides with its working environment (for example, other robots, operators, objects, processed workpieces). Once a collision occurs, such as a collision between robots or a collision between a robot and a processing object (for example, a processed workpiece), the robot or the processing object may be damaged. An efficient robot collision processing solution will protect the robot and its working environment to the maximum extent, thereby reducing a cost loss caused by the shutdown or component replacement due to the collision.

So far, the provided robot collision processing solutions are collision detection solutions based on current or torque, and the work performed by the robot is stopped after a collision is detected.

SUMMARY

In view of the foregoing, the inventors have discovered that the above solutions do not fundamentally address potential losses due to collisions.

Embodiments of the present application provide a method and apparatus for determining a trajectory of a robot's end effector. With at least one embodiment of the method and apparatus, after a collision of the end effector is detected, a trajectory of the end effector after the collision is determined based on a collision force of the end effector caused by the collision and a recorded trajectory of the end effector before the collision, and the end effector is controlled to move based on the determined trajectory, so that an efficient protection of the robot may be achieved.

According to an embodiment of the subject matter described herein, a method of determining a trajectory of a robot's end effector is provided. The method of an embodiment comprises: obtaining a collision force of a robot's end effector caused by a collision of the end effector when the collision is detected; and determining a second trajectory of the end effector based on the obtained collision force of the end effector and a recorded first trajectory of the end effector, wherein the first trajectory is a trajectory before the collision, and the second trajectory is a trajectory after the collision.

According to an embodiment of the subject matter, an apparatus for determining a trajectory of a robot's end effector is provided. The apparatus comprising:
a force obtaining device to obtain a collision force of the end effector of the robot, caused by a collision of the end effector upon the collision being detected; and
a trajectory determining device to determine a second trajectory of the end effector based on the collision force of the end effector obtained, and based on a recorded first trajectory of the end effector,
wherein the first trajectory is a trajectory recorded before the collision, and the second trajectory is a trajectory determined after the collision.

According to an embodiment of the subject matter, an apparatus for determining a trajectory of a robot's end effector is provided. The apparatus comprising:
one or more processors; and
a memory coupled to the one or more processors, for storing computer-executable instructions that, when executed, cause the one or more processors to
obtain a collision force of the end effector of the robot, caused by a collision of the end effector upon the collision being detected, and
determine a second trajectory of the end effector based on the collision force of the end effector obtained, and based on a recorded first trajectory of the end effector,
wherein the recorded first trajectory is a trajectory recorded before the collision, and the second trajectory is a trajectory determined after the collision.

Preferably, in an example of the above embodiment, the apparatus may comprise: a controlling unit (including at least one processor or programed processing circuitry (e.g. an ASIC) for example) for controlling the end effector to move based on the determined second trajectory.

According to an embodiment of the subject matter, a computer device for determining a trajectory of a robot's end effector is provided, the computer device comprising: one or more processors; and a memory coupled to the one or more processors, for storing computer-executable instructions that, when executed, cause the one or more processors to perform the method for determining a trajectory of a robot's end effector as above.

According to an embodiment of the subject matter, a non-transitory machine-readable medium having computer-executable instructions to cause a machine to perform the method for determining a trajectory of a robot's end effector of at least one embodiment.

According to an embodiment of the subject matter, a system for determining a trajectory of a robot's end effector is provided. The system may comprise: a collision force detecting apparatus for detecting a collision force of a robot's end effector caused by a collision of the end effector when the collision is detected; and an apparatus for determining a trajectory of a robot's end effector of at least one embodiment.

BRIEF DESCRIPTION OF THE DRAWINGS

Various embodiments, features and advantages of the subject matter will be more apparent from the detailed description set forth below when taken in conjunction with the drawings, in which use of the same reference number in different figures indicates similar or identical items.

Figure 1:
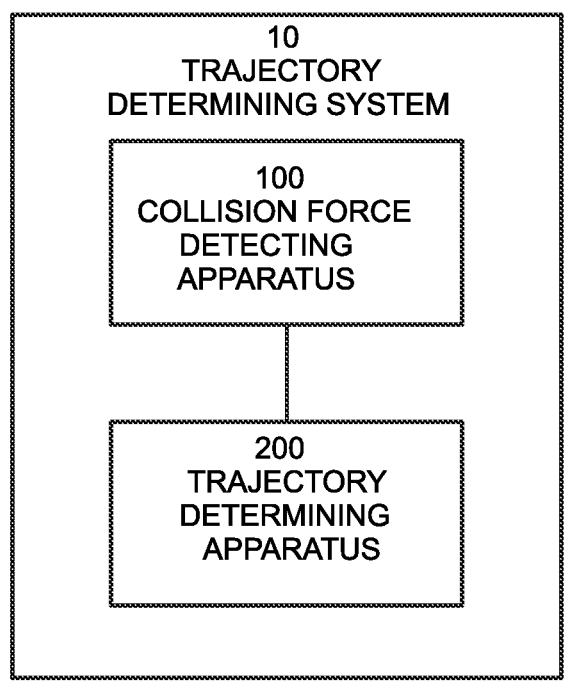
FIG. 1 illustrates a block diagram of a system for determining a trajectory of a robot's end effector according to an embodiment of the subject matter.

10 trajectory determining system
100 collision force detecting apparatus
200 trajectory determining apparatus
210 force obtaining unit
220 trajectory determining unit
230 recording unit
240 configuring unit
250 controlling unit
221 obtaining module
223 first determining module
225 second determining module
S510 obtain a collision force on the end effector
S530 determine a second trajectory of the end effector based on the obtained collision force of the end effector and a recorded first trajectory of the end effector
S550 control the end effector to move based on the determined second trajectory
S531 obtain trajectory information of each trajectory point on the first trajectory
S533 determine a displacement vector, a velocity vector and an acceleration vector of the end effector caused by the collision force
S535 determine trajectory information of each trajectory point on the second trajectory
700 computer device
710 one and more processors
720 memory

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The subject matter described herein will now be discussed with reference to example embodiments. It should be understood that these embodiments are discussed only for the purpose of enabling those skilled persons in the art to better understand and thus implement the subject matter described herein, rather than suggesting a limitation on the scope of protection, applicability, or examples set forth in the claims. Changes may be made in the function and arrangement of the elements discussed without departing from the scope of the disclosure. Each embodiment may omit, substitute, or add various procedures or components as needed. For example, the methods described may be performed in a different order than described, and various steps may be added, omitted, or combined. In addition, features described with respect to some embodiments may also be combined in other embodiments.

As used herein, term "comprise/include" and its variants refer to open terms that mean "comprises/includes, but is not limited to". The term "based on" refers to "based at least in part on". The terms "one embodiment" and "an embodiment" refer to "at least one implementation". The term "another embodiment" refers to "at least one other embodiment". The term "a" or "an" is to be read as "at least one". The terms "first", "second", and the like may refer to different or same objects. Other definitions, explicit and implicit, may be included below. A definition of a term is consistent throughout the description unless the context clearly indicates otherwise.

As used herein, term "impedance control model" means a dynamic mathematical model between the robot's external force and the robot's position, velocity, and acceleration. Here, the impedance represents the resistance trend of the robot when the robot is subjected to external forces.

According to an embodiment of the subject matter described herein, a method of determining a trajectory of a robot's end effector is provided. The method of an embodiment comprises: obtaining a collision force of a robot's end effector caused by a collision of the end effector when the collision is detected; and determining a second trajectory of the end effector based on the obtained collision force of the end effector and a recorded first trajectory of the end effector, wherein the first trajectory is a trajectory before the collision, and the second trajectory is a trajectory after the collision.

Preferably, in an example of the above embodiment, the end effector is modeled as an impedance control model, and determining a second trajectory of the end effector based on the obtained collision force of the end effector and a recorded first trajectory of the end effector may comprise: determining the second trajectory of the end effector using the impedance control model, based on the obtained collision force and the recorded first trajectory of the end effector.

Preferably, in an example of the above embodiment, each trajectory point of the trajectory has trajectory information including a position vector, a velocity vector of each trajectory point, and an acceleration vector of the trajectory point, and the impedance control model is $f_{collision}=M\ddot{X}+B\dot{X}+KX$, where $f_{collision}$ is a collision force of the end effector caused by the collision, and X is a displacement vector of the end effector caused by the collision force, $\dot{X}$ and $\ddot{X}$ are the velocity vector and the acceleration vector of the end effector caused by the collision force, respectively, M is an inertia matrix of the end effector, B is a damping matrix of the end effector, and K is a stiffness matrix of the end effector.

Preferably, in an example of the above embodiment, the method may further comprise: configuring the inertia matrix, the damping matrix, and the stiffness matrix of the end effector under the impedance control model.

Preferably, in an example of the above embodiment, the first trajectory is composed of discrete trajectory points ($P_1$, $P_2$, . . . , $P_M$), and determining a second trajectory of the end effector based on the obtained collision force of the end effector and a recorded first trajectory of the end effector may comprise: obtaining the trajectory information of each discrete trajectory point ($P_1$, $P_2$, . . . , $P_M$) on the recorded first trajectory; determining a displacement vector, a velocity vector and an acceleration vector of the end effector caused by the collision force using the impedance control model, based on the obtained collision force; and determining trajectory information of each discrete trajectory point ($P_1'$, $P_2'$, . . . , $P_N'$) on the second trajectory, based on the obtained trajectory information of each discrete trajectory point ($P_1$, $P_2$, . . . , $P_M$) on the first trajectory and the displacement vector, the velocity vector and the acceleration vector of the end effector caused by the collision force.

Preferably, in an example of the above embodiment, determining trajectory information of each discrete trajectory point on the second trajectory ($P_1'$, $P_2'$, . . . , $P_N'$) may comprise: obtaining an inverse discrete trajectory point arrangement ($P_M$, $P_{M-1}$, . . . $P_1$) of the first motion trajectory by inversely arranging the discrete trajectory points ($P_1$, $P_2$, . . . , $P_M$) on the first trajectory; and determining the trajectory information of each discrete trajectory point ($P_1'$, $P_2'$, . . . , $P_N'$) on the second trajectory one by one, based on the trajectory information of each discrete trajectory point ($P_M$, $P_{M-1}$, . . . $P_1$) in the inverse discrete trajectory point arrangement and the displacement vector, the velocity vector and the acceleration vector of the end effector caused by the collision force, until the trajectory information of the end trajectory point of the second trajectory is determined, wherein the trajectory distance between the end trajectory point ($P_{N'}$) and the start trajectory point ($P_1'$) of the second trajectory is closest to the displacement distance of the end effector caused by the collision force, wherein the position vector of each discrete trajectory point is determined to be same as the position vector of the corresponding discrete trajectory point in the reverse discrete trajectory point arrangement, the directions of the velocity vector and the acceleration vector of each discrete trajectory point on the second trajectory are determined to be opposite to the directions of the velocity vector and the acceleration vector of the corresponding discrete trajectory point in the reverse discrete trajectory point arrangement, and the velocity vector and the acceleration vector of the end trajectory point of the second trajectory are set to zero, wherein the velocity value and the acceleration value of each other trajectory point $P_{i'}$ (i=1, . . . , N−1) of the second trajectory other than the end trajectory point are determined according to the following formula:

$$V_i' = \begin{cases} \left(\frac{|\dot{X}|}{i}+|\dot{X}_{M-i+1}|\right) & \left(\frac{|\dot{X}|}{i}+|\dot{X}_{M-i+1}|\right) < V_{limit} \\ V_{limit} & \left(\frac{|\dot{X}|}{i}+|\dot{X}_{M-i+1}|\right) \geq V_{limit} \end{cases},$$

$$A_i' = \begin{cases} \left(\frac{|\ddot{X}|}{i}+|\ddot{X}_{M-i+1}|\right) & \left(\frac{|\ddot{X}|}{i}+|\ddot{X}_{M-i+1}|\right) < A_{limit} \\ A_{limit} & \left(\frac{|\ddot{X}|}{i}+|\ddot{X}_{M-i+1}|\right) \geq A_{limit} \end{cases}$$

wherein $V_{limit}$ is a velocity threshold, and $A_{limit}$ is an acceleration threshold.

Preferably, in an example of the above embodiment, the method may comprise: controlling the end effector to move based on the determined second trajectory.

Preferably, in an example of the above embodiment, the second trajectory is composed of discrete trajectory points, and controlling the end effector to move based on the determined second trajectory may comprise: controlling the end effector to move according to the determined trajectory information of each discrete trajectory point on the second trajectory.

According to an embodiment of the subject matter, an apparatus for determining a trajectory of a robot's end effector is provided. The apparatus may comprise: a force obtaining unit for obtaining a collision force of a robot's end effector caused by a collision of the end effector when the collision is detected; and a trajectory determining unit for determining a second trajectory of the end effector based on the obtained collision force of the end effector and a recorded first trajectory of the end effector, wherein the first trajectory is a trajectory before the collision, and the second trajectory is a trajectory after the collision.

Preferably, in an example of the above embodiment, the end effector is modeled as an impedance control model, and the trajectory determining unit may be configured to: determine the second trajectory of the end effector using the impedance control model, based on the obtained collision force and the recorded first trajectory of the impedance control model.

Preferably, in an example of the above embodiment, each trajectory point of the trajectory has trajectory information including a position vector, a velocity vector of the trajectory point, and an acceleration vector of the trajectory point, and the impedance control model is $f_{collision}=M\ddot{X}+B\dot{X}+KX$, where $f_{collision}$ is a collision force of the end effector caused by the collision, and X is a displacement vector of the end effector caused by the collision force, $\dot{X}$ and $\ddot{X}$ are the velocity vector and the acceleration vector of the end effector caused by the collision force, respectively, M is an inertia matrix of the end effector, B is a damping matrix of the end effector, and K is a stiffness matrix of the end effector.

Preferably, in an example of the above embodiment, the apparatus may further comprise: a configuring unit for configuring the inertia matrix, the damping matrix, and the stiffness matrix of the end effector under the impedance control model.

Preferably, in an example of the above embodiment, the first trajectory is composed of discrete trajectory points ($P_1$, $P_2$, . . . , $P_M$), and the trajectory determining unit may comprise: an obtaining module for obtaining the trajectory information of each discrete trajectory point ($P_1$, $P_2$, . . . , $P_M$) on the recorded first trajectory; a first determining module for determining a displacement vector, a velocity vector and an acceleration vector of the end effector caused by the collision force using the impedance control model, based on the obtained collision force; and a second determining module for determining trajectory information of each discrete trajectory point ($P_{1'}$, $P_{2'}$, . . . , $P_{N'}$) on the second trajectory, based on the obtained trajectory information of each discrete trajectory point ($P_1$, $P_2$, . . . , $P_M$) on the first trajectory and the displacement vector, the velocity vector and the acceleration vector of the end effector caused by the collision force.

Preferably, in an example of the above embodiment, the second determining module may be configured to: obtain an inverse discrete trajectory point arrangement ($P_M$, $P_{M-1}$, . . . $P_1$) of the first motion trajectory by inversely arranging the discrete trajectory points ($P_1$, $P_2$, . . . , $P_M$) on the first trajectory; and determine the trajectory information of each discrete trajectory point ($P_{1'}$, $P_{2'}$, . . . , $P_{N'}$) on the second trajectory one by one, based on the trajectory information of each discrete trajectory point ($P_M$, $P_{M-1}$, . . . $P_1$) in the inverse discrete trajectory point arrangement and the displacement vector, the velocity vector and the acceleration vector of the end effector caused by the collision force, until the trajectory information of the end trajectory point of the second trajectory is determined, wherein the trajectory distance between the end trajectory point ($P_{N'}$) and the start trajectory point ($P_{1'}$) of the second trajectory is closest to the displacement distance of the end effector caused by the collision force, wherein the position vector of each discrete trajectory point is determined to be same as the position vector of the corresponding discrete trajectory point in the reverse discrete trajectory point arrangement, the directions of the velocity vector and the acceleration vector of each discrete trajectory point on the second trajectory are determined to be opposite to the directions of the velocity vector and the acceleration vector of the corresponding discrete trajectory point in the reverse discrete trajectory point arrangement, and the velocity vector and the acceleration vector of the end trajectory point of the second trajectory are set to zero, wherein the velocity value and the acceleration value of each other trajectory point $P_{i'}$ (i=1, . . . , N−1) of the second trajectory other than the end trajectory point are determined according to the following formula:

$$V'_i = \begin{cases} \left(\frac{|\dot{X}|}{i}+|\dot{X}_{M-i+1}|\right) & \left(\frac{|\dot{X}|}{i}+|\dot{X}_{M-i+1}|\right) < V_{limit} \\ V_{limit} & \left(\frac{|\dot{X}|}{i}+|\dot{X}_{M-i+1}|\right) \geq V_{limit} \end{cases},$$

$$A'_i = \begin{cases} \left(\frac{|\ddot{X}|}{i}+|\ddot{X}_{M-i+1}|\right) & \left(\frac{|\ddot{X}|}{i}+|\ddot{X}_{M-i+1}|\right) < A_{limit} \\ A_{limit} & \left(\frac{|\ddot{X}|}{i}+|\ddot{X}_{M-i+1}|\right) \geq A_{limit} \end{cases}$$

wherein $V_{limit}$ a velocity threshold, and $A_{limit}$ is an acceleration threshold.

Preferably, in an example of the above embodiment, the apparatus may comprise: a controlling unit (including at least one processor or programed processing circuitry (e.g. an ASIC) for example) for controlling the end effector to move based on the determined second trajectory.

According to an embodiment of the subject matter, a computer device for determining a trajectory of a robot's end effector is provided, the computer device comprising: one or more processors; and a memory coupled to the one or more processors, for storing computer-executable instructions that, when executed, cause the one or more processors to perform the method for determining a trajectory of a robot's end effector as above.

According to an embodiment of the subject matter, a non-transitory machine-readable medium having computer-executable instructions to cause a machine to perform the method for determining a trajectory of a robot's end effector of at least one embodiment.

According to an embodiment of the subject matter, a system for determining a trajectory of a robot's end effector is provided. The system may comprise: a collision force detecting apparatus for detecting a collision force of a robot's end effector caused by a collision of the end effector when the collision is detected; and an apparatus for determining a trajectory of a robot's end effector of at least one embodiment.

With embodiments of the above method, apparatus and system, after a collision of the end effector is detected, a trajectory of the end effector after the collision is determined based on a detected collision force of the end effector caused by the collision and a recorded trajectory of the end effector before the collision, and thus protection of the robot and its work environment may be significantly improved.

With embodiments of the above method, apparatus and system, by introducing an impedance control mechanism in determination of the end effector's trajectory after collision, a secondary collision between the robot and the working environment may be avoided to occur after the collision to the utmost extent, thereby avoiding the secondary damage of the robot itself and its working environment.

With embodiments of the above method, apparatus and system, by configuring the inertia matrix, the damping matrix, and the stiffness matrix of the impedance control model, the movement of the robot after the collision may be controllable.

With embodiments of the above method, apparatus and system, by setting the position of the trajectory point of the trajectory of the end effector (i.e., the second motion trajectory) after collision to be same as the position of the trajectory point of the original trajectory (i.e., the first motion trajectory), when the movement of the robot along the second trajectory is finished (i.e., the movement along the second trajectory is stopped), there is no need to perform additional trajectory planning again, and the movement may be quickly restored based on the original collision-free trajectory.

In the event of a robot collision, it is usually that the robot's end effector collides with other robots, operators, objects or work pieces in the work environment. Therefore, the handling for the robot's end effector's further trajectory is a key issue when the collision of the robot occurs. In the present disclosure, a solution for determining the following trajectory of a robot's end effector after a collision is provided, and thus the deviation of the trajectory due to the collision may be minimized and the robot may restore to the original trajectory as soon as possible, by controlling the trajectory of the end effector after collision.

FIG. 1 illustrates a block diagram of a system for determining a trajectory of a robot's end effector (Hereinafter referred to simply as a trajectory determining system 10) according to an embodiment of the subject matter.

As shown in FIG. 1, the trajectory determining system 10 includes a collision force detecting apparatus 100 for detecting a collision force of a robot's end effector caused by a collision of the end effector when the collision is detected, that is, the collision between the end effector and other robots, operators, obstacle, or processed objects (e.g., processed workpieces) in the robot's environment. Here, the detected collision force is a vector having a direction and a magnitude. The collision force detecting device 100 may be any type of force detecting device, such as a force sensor or the like.

The trajectory determining system 10 further includes an apparatus 200 (hereinafter simply referred to as a "trajectory determining apparatus 200") for determining a trajectory of a robot's end effector, so that the robot is caused to move along the determined trajectory through a robot controller. The trajectory determining system 10 may be apart of the robot controller, or a separate system. The trajectory determining apparatus 200 is coupled or otherwise connected or communicated to the collision force detecting apparatus 100 in a wired or wireless manner, and is used to determine the trajectory of the end effector after the collision, based on the subjected collision force of the end effector detected by the collision force detecting device 100 and the recorded trajectory of the end effector before the collision.

Figure 2:
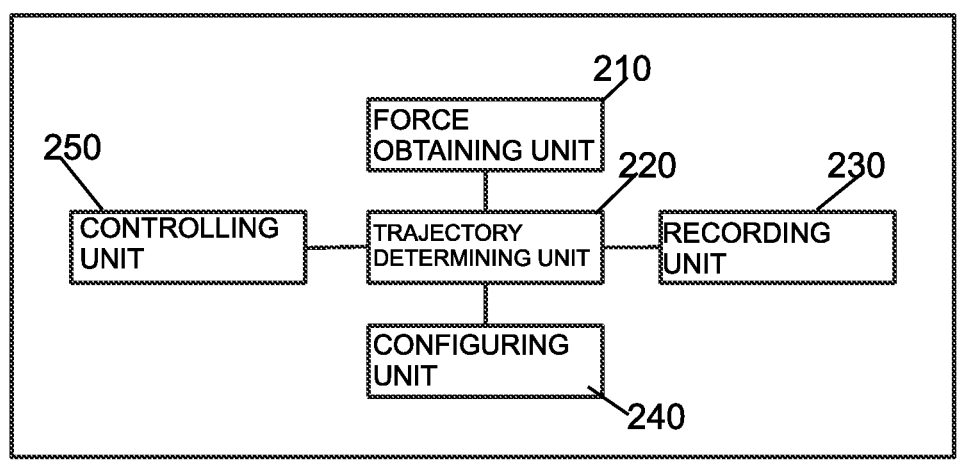
FIG. 2 illustrates a block diagram of an apparatus for determining a trajectory of a robot's end effector according to an embodiment of the subject matter.

FIG. 2 illustrates an example block diagram of a trajectory determining apparatus 200 according to an embodiment of the subject matter. As shown in FIG. 2, trajectory determining apparatus 200 may include a force obtaining unit 210. The force obtaining unit 210 is configured to obtain the detected collision force of the end effector from the collision force detecting apparatus 100. The force obtaining unit 210 may communicate with the collision force detecting apparatus 100 by way of active acquisition or passive reception to obtain the collision force suffered by the end effector. The communication between the force obtaining unit 210 and the collision force detecting apparatus 100 may be a wired communication or a wireless communication.

The trajectory determining apparatus 200 may further include a trajectory determining unit 220. The trajectory determining unit 220 is configured to determine a second trajectory of the end effector based on the obtained collision force and the recorded first trajectory of the end effector. Here, the first trajectory is the trajectory of the end effector before the collision, and the second trajectory is the trajectory of the end effector after the collision, that is, the planned trajectory of the end effector after the collision. The second trajectory is a controllable trajectory along which the robot is desired to move after the collision, rather than an uncontrollable spontaneous trajectory. Each trajectory point of the first and second trajectory has trajectory information including a position vector, a velocity vector, and an acceleration vector of the trajectory point.

Preferably, in an example, the trajectory determining apparatus 200 may further include a recording unit 230. The recording unit 230 is configured to record the first trajectory of the end effector. For example, the recording unit 230 records trajectory information of the first trajectory.

Further, in an example of the disclosure, during the determination of the second trajectory of the end effector, the end effector is modeled as an impedance control model. In special, the impedance control model is $f_{collision}=M\ddot{X}+B\dot{X}+KX$, where $f_{collision}$ is a collision force of the end effector caused by the collision, X is a displacement vector of the end effector caused by the collision force, for example, $X=[x, y, z]^T$, x, y and z represent the X-axis, Y-axis, and Z-axis coordinates of the collision position, respectively, T represent transposition function, $\dot{X}$ and $\ddot{X}$ are the velocity vector and the acceleration vector of the end effector caused by the collision force, respectively, M is an inertia matrix of the end effector, B is a damping matrix of the end effector, and K is a stiffness matrix of the end effector. Here, it is noted that, M, B, and K are pre-configured parameter quantities that may be set based on actual conditions or experiences. In this case, the trajectory determining apparatus 200 may further include a configuration unit 240. The configuration unit 240 configured to configure the inertia matrix, the damping matrix, and the stiffness matrix of the end effector under the impedance control model.

In the case where the end effector is modeled as an impedance control model, the trajectory determining unit 220 determines the second trajectory of the end effector using the impedance control model, based on the obtained collision force and the recorded first trajectory of the end effector.

Figure 3:
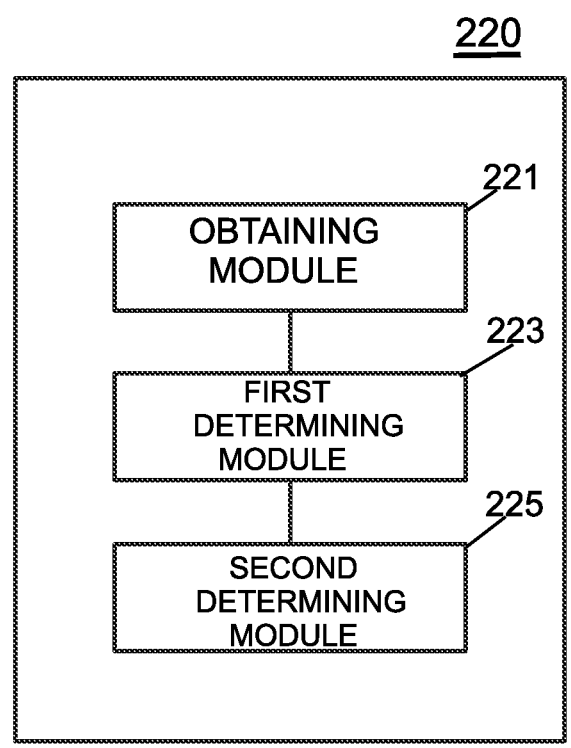
FIG. 3 illustrates an example block diagram of a trajectory determining unit of FIG. 2 according to an embodiment of the subject matter.
Figure 4:
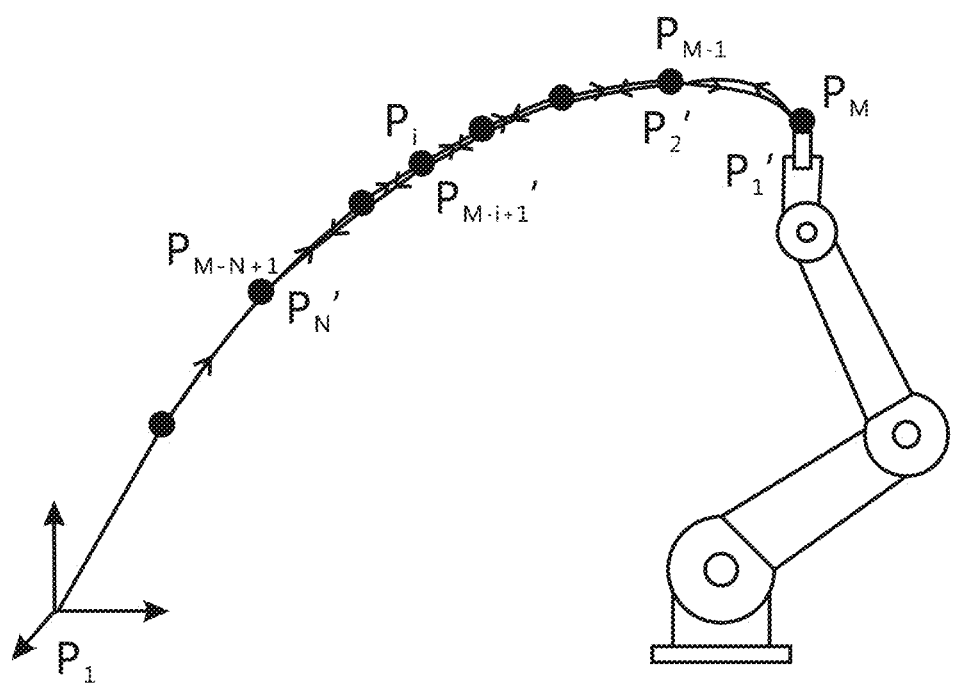
FIG. 4 illustrates an example trajectory of the end effector according to an embodiment of the subject matter.

In addition, alternatively, the first trajectory and the second trajectory may be a set of discrete trajectory points. For example, as shown in FIG. 4, the first trajectory is composed of discrete trajectory points $P_1, P_2, \ldots, P_M$, where $P_1$ is the start trajectory point, and PM is the end trajectory point. The second trajectory is composed of discrete trajectory points $P_{1'}, P_{2'}, \ldots, P_{N'}$, where $P_{1'}$ is the start trajectory point and PN' is the end trajectory point. In this case, as shown in FIG. 3, the trajectory determining unit 220 may include an obtaining module 221, a first determining module 223, and a second determining module 225.

The obtaining module 221 is configured to obtain, from the recording unit 230, trajectory information of each discrete trajectory point on the recorded first trajectory, i.e., a position vector, a velocity vector, and an acceleration vector of each discrete trajectory point. Then, the first determining module 223 determines a displacement vector, a velocity vector and an acceleration vector of the end effector caused by the collision force using the impedance control model, based on the obtained collision force, i.e., a displacement vector of the end effector from the collision position, a velocity vector and an acceleration vector of the end effector at the collision position corresponding to the collision force, which are computed based on the impedance control model. Specifically, the kinematics equation $f_{collision}=M\ddot{X}+B\dot{X}+KX$ is solved to obtain the displacement vector, the velocity vector, and the acceleration vector of the end effector caused by the collision force $f_{collision}$.

Then, the second determining module 225 determines trajectory information of each discrete trajectory point (P1', P2', . . . , PN') on the second trajectory, based on the obtained trajectory information of each discrete trajectory point ($P_1$, $P_2$, . . . , $P_M$) on the first trajectory and the displacement vector, the velocity vector and the acceleration vector of the end effector caused by the collision force.

In an example of the disclosure, in determination of trajectory information of each discrete trajectory point ($P_{1'}$, $P_{2'}$, . . . , $P_{N'}$) on the second trajectory, the second determining module 225 first obtains an inverse discrete trajectory point arrangement ($P_M$, $P_{M-1}$, . . . $P_1$) of the first trajectory by inversely arranging the discrete trajectory points ($P_1$, $P_2$, . . . , $P_M$) on the first trajectory. Then, the second determining unit 225 determines the trajectory information of each discrete trajectory point ($P_{1'}$, $P_{2'}$, . . . , $P_{N'}$) on the second trajectory one by one, based on the trajectory information of each discrete trajectory point ($P_M$, $P_{M-1}$, . . . $P_1$) in the inverse discrete trajectory point arrangement and the displacement vector, the velocity vector and the acceleration vector of the end effector caused by the collision force, until the trajectory information of the end trajectory point of the second trajectory is determined, wherein the trajectory distance between the end trajectory point $P_{N'}$ and the start trajectory point $P_{1'}$ (that is, the end trajectory point $P_M$ of the first trajectory) of the second trajectory is closest to the displacement distance |X| of the end effector caused by the collision force. Here, the corresponding relationship between the inverse discrete trajectory point arrangement $P_M$, $P_{M-1}$, . . . , $P_1$ and the discrete trajectory points on the second trajectory is: $P_M$ corresponds to $P_{1'}$, and $P_{M-1}$ corresponds to $P_{2'}$, . . . , and so on.

In the disclosure, the end trajectory point on the second trajectory is determined by calculating the trajectory distance between the current trajectory point and the start trajectory point $P_{1'}$ (i.e., the end trajectory point $P_M$ of the first motion trajectory) of the second trajectory, and then further calculating the difference between the calculated trajectory distance and the displacement distance |X| of the end effector caused by the collision force, determining whether the difference is smaller than a predetermined threshold δ, wherein the predetermined threshold δ is a set minimum value.

Further, in the disclosure, the trajectory distance between the current trajectory point $P_{i'}$ of the second trajectory and the start trajectory point $P_{1'}$ (i.e., the end trajectory point $P_M$ of the first motion trajectory) of the second trajectory is obtained by summing the vector distances between all two adjacent trajectory points of the trajectory points $P_{1'}$, $P_{2'}$, . . . , $P_{i'}$. For the second trajectory, the vector distance between two adjacent trajectory points is calculated using the formula $\Delta\vec{P}_i=\sqrt{|\vec{P}_{i-1}|^2-|\vec{P}_i|^2}$, where $\vec{P}_i$ is the position vector of the trajectory point $P_{i'}$.

The determination process of the end trajectory point of the second trajectory will be described below using an example. First, the calculation starts by taking the trajectory point $P_{1'}$ as the current trajectory point. At this time, the trajectory distance is 0, which does not satisfy the determination condition that the aforementioned difference is smaller than the predetermined threshold δ. Then, the current trajectory point is moved to the trajectory point $P_{2'}$, and then the vector distance $\Delta\vec{P}_2$ between $P_{1'}$ and $P_{2'}$ is calculated as the trajectory distance between the trajectory points $P_{2'}$ and $P_{1'}$ as above, and then the calculated trajectory distance is compared with the displacement distance |X| of the end effector caused by the collision force. If the difference is smaller than the predetermined threshold δ, the trajectory point $P_{2'}$ is the end trajectory point of the second trajectory. Otherwise, the current trajectory point is moved to the trajectory point $P_{3'}$, and then the vector distance $\Delta\vec{P}_3$ between the trajectory points $P_{2'}$ and $P_{3'}$ is calculated as above. Then, the sum of the vector distances $\Delta\vec{P}_2$ and $\Delta\vec{P}_3$ is taken as the trajectory distance between the trajectory points $P_{3'}$ and $P_{1'}$. If the difference is smaller than the predetermined threshold δ, the trajectory point $P_{3'}$ is the end trajectory point of the second trajectory. Otherwise, the current trajectory point is moved to the trajectory point $P_{4'}$, as similarly calculated and compared as above, until the end trajectory point of the second trajectory is determined.

Further, when the second determining module 225 determines the trajectory information of each discrete trajectory point on the second trajectory one by one, the position vector of each discrete trajectory point is determined to be same as the position vector of the corresponding discrete trajectory point in the reverse discrete trajectory point arrangement, and the directions of the velocity vector and the acceleration vector of each discrete trajectory point on the second trajectory are determined to be opposite to the directions of the velocity vector and the acceleration vector of the corresponding discrete trajectory point in the reverse discrete trajectory point arrangement. In this way, when the movement of the robot along the second trajectory is finished (i.e., the movement along the second trajectory is stopped), there is no need to perform additional trajectory planning again, and the movement may be quickly restored based on the original collision-free trajectory. Further, the second determining module 225 set the velocity vector and the acceleration vector of the end trajectory point of the second trajectory to be zero.

Moreover, the velocity value and the acceleration value of each other trajectory point $P_{i'}$ (i=1, . . . , N−1) of the second trajectory other than the end trajectory point are determined according to the following formula:

$$V'_i = \begin{cases} \left(\frac{|\dot{X}|}{i}+|\dot{X}_{M-i+1}|\right) & \left(\frac{|\dot{X}|}{i}+|\dot{X}_{M-i+1}|\right) < V_{limit} \\ V_{limit} & \left(\frac{|\dot{X}|}{i}+|\dot{X}_{M-i+1}|\right) \geq V_{limit} \end{cases},$$

$$A'_i = \begin{cases} \left(\frac{|\ddot{X}|}{i}+|\ddot{X}_{M-i+1}|\right) & \left(\frac{|\ddot{X}|}{i}+|\ddot{X}_{M-i+1}|\right) < A_{limit} \\ A_{limit} & \left(\frac{|\ddot{X}|}{i}+|\ddot{X}_{M-i+1}|\right) \geq A_{limit} \end{cases}$$

wherein $V_{limit}$ is a velocity threshold, and $A_{limit}$ is an acceleration threshold.

Here, $V_{limit}$ and $A_{limit}$ are factory setting. Once $V_{limit}$ and $A_{limit}$ are set, the values thereof are usually invariable.

The determination process of the second motion trajectory as above will be described with reference to FIG. 4 as an example. As shown in FIG. 4, before a collision of the end effector occurs, the trajectory (i.e., the first trajectory) of the end effector is a trajectory composed of discrete trajectory points $P_1$, $P_2$, . . . , $P_M$. As the end effector moves, the trajectory information (i.e., a position vector, a velocity vector, and an acceleration vector) of each trajectory point for the end effector is recorded simultaneously.

After it is detected that a collision of the end effector occurs at the point $P_M$, the collision force detecting apparatus 100 detects the collision force suffered by the end effector at this time. Then, the first determining module 223 in the trajectory determining apparatus 200 obtains the displacement vector, the velocity vector, and the acceleration vector of the end effector caused by the detected collision force $f_{collision}$, by solving kinematics equation $f_{collision} = M\ddot{X} + B\dot{X} + KX$.

Then, the second determining module 225 in the trajectory determining apparatus 200 determines the trajectory information of each trajectory point on the second trajectory one by one, based on trajectory information of each discrete trajectory point $P_1, P_2, \ldots, P_M$ and the obtained displacement vector X, velocity vector $\dot{X}$ and acceleration vector $\ddot{X}$.

In specially, the second determining module 225 determines that the position vector of a start trajectory point $P_{1'}$ of the second trajectory is same as the position vector of the end trajectory point $P_M$ on the first trajectory, and the directions of the velocity vector and the acceleration vector of the start trajectory point $P_{1'}$ of the second trajectory are opposite to the directions of the velocity vector and the acceleration vector of the end trajectory point $P_M$ on the first trajectory. Further, the velocity value and the acceleration value of the start trajectory point P1' of the second trajectory are determined according to the following formula:

$$V'_i = \begin{cases} (|\dot{X}| + |\dot{X}_M|) & (|\dot{X}| + |\dot{X}_M|) < V_{limit} \\ V_{limit} & (|\dot{X}| + |\dot{X}_M|) \geq V_{limit} \end{cases},$$

$$A'_i = \begin{cases} (|\ddot{X}| + |\ddot{X}_M|) & (|\ddot{X}| + |\ddot{X}_M|) < A_{limit} \\ A_{limit} & (|\ddot{X}| + |\ddot{X}_M|) \geq A_{limit} \end{cases},$$

wherein $V_{limit}$ is a velocity threshold, and $A_{limit}$ is an acceleration threshold.

After obtaining the start trajectory point $P_{1'}$ of the second trajectory as above, the second trajectory point of the second trajectory is then determined. At this time, the second determining module 225 determines that the position vector of the second trajectory point $P_{2'}$ of the second trajectory is same as the position vector of the trajectory point $P_{M-1}$ on the first trajectory, and the directions of the velocity vector and the acceleration vector of the second trajectory point $P_{2'}$ of the second trajectory are opposite to the directions of the velocity vector and the acceleration vector of the trajectory point $P_{M-1}$ on the first trajectory. Further, the velocity value and the acceleration value of the second trajectory point $P_{2'}$ of the second trajectory are determined according to the following formula:

$$V'_2 = \begin{cases} \left(\frac{|\dot{X}|}{2} + |\dot{X}_{M-1}|\right) & \left(\frac{|\dot{X}|}{2} + |\dot{X}_{M-1}|\right) < V_{limit} \\ V_{limit} & \left(\frac{|\dot{X}|}{2} + |\dot{X}_{M-1}|\right) \geq < V_{limit} \end{cases},$$

$$A'_2 = \begin{cases} \left(\frac{|\ddot{X}|}{2} + |\ddot{X}_{M-1}|\right) & \left(\frac{|\ddot{X}|}{2} + |\ddot{X}_{M-1}|\right) < A_{limit} \\ A_{limit} & \left(\frac{|\ddot{X}|}{2} + |\ddot{X}_{M-1}|\right) \geq A_{limit} \end{cases},$$

wherein $V_{limit}$ is a velocity threshold, and $A_{limit}$ is an acceleration threshold.

Next, in the similar manner as the second trajectory point $P_{2'}$, subsequent trajectory points $P_{i'}$ on the second motion trajectory are sequentially obtained until the end trajectory point $P_{N'}$ of the second motion trajectory is obtained. As for the trajectory points $P_{i'}$, the second determining module 225 determines that the position vector of the trajectory point $P_{i'}$ of the second trajectory is same as the position vector of the trajectory point $P_{M-i+1}$ on the first trajectory, and the directions of the velocity vector and the acceleration vector of the trajectory point $P_{i'}$ of the second trajectory are opposite to the directions of the velocity vector and the acceleration vector of the trajectory point $P_{M-i+1}$ on the first trajectory. Further, the velocity value and the acceleration value of the second trajectory point $P_{i'}$ (i=1, ..., N−1) of the second trajectory are determined according to the following formula:

$$V'_i = \begin{cases} \left(\frac{|\dot{X}|}{i} + |\dot{X}_{M-i+1}|\right) & \left(\frac{|\dot{X}|}{i} + |\dot{X}_{m-i+1}|\right) < V_{limit} \\ V_{limit} & \left(\frac{|\dot{X}|}{i} + |\dot{X}_{M-i+1}|\right) \geq V_{limit} \end{cases},$$

$$A'_i = \begin{cases} \left(\frac{|\ddot{X}|}{i} + |\ddot{X}_{M-i+1}|\right) & \left(\frac{|\ddot{X}|}{i} + |\ddot{X}_{M-i+1}|\right) < A_{limit} \\ A_{limit} & \left(\frac{|\ddot{X}|}{i} + |\ddot{X}_{M-i+1}|\right) \geq A_{limit} \end{cases},$$

wherein $V_{limit}$ a velocity threshold, and $A_{limit}$ is an acceleration threshold.

In addition, the trajectory determining apparatus 200 may further include a controlling unit 250. The controlling unit 250 is configured to control the end effector to move based on the determined second trajectory after the second motion trajectory of the end effector is obtained as above. In addition, alternatively, when the second trajectory is composed of discrete trajectory points, after the trajectory information of each discrete trajectory point on the second trajectory are determined, the controlling unit 250 may control the end effector to move according to the determined trajectory information of the discrete trajectory point on the second trajectory.

The apparatus and system for determining a trajectory of a robot's end effector according to an embodiment of the subject matter are described above with reference to FIGS. 1 to 4, and a method for determining a trajectory of a robot's end effector according to an embodiment of the subject matter will be described below with reference to FIGS. 5 to 6.

Figure 5:
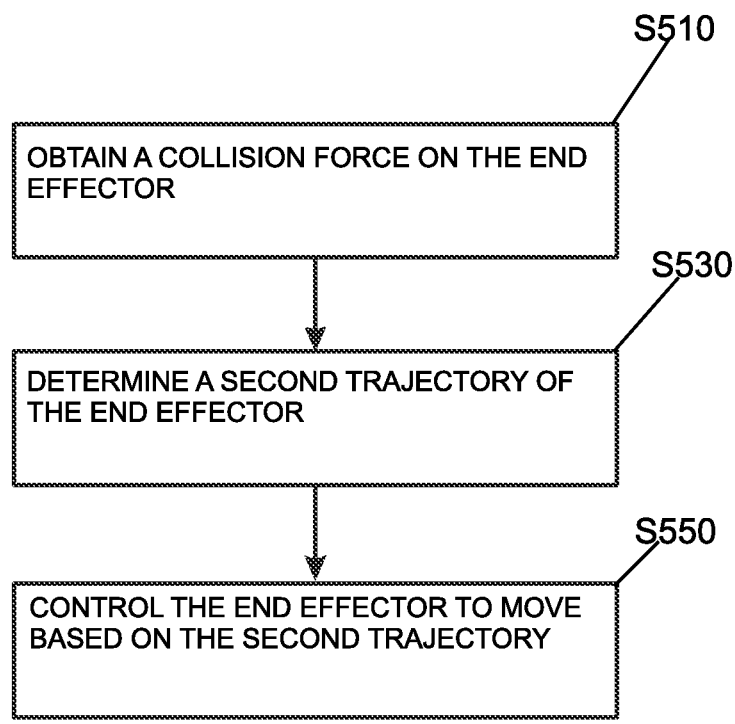
FIG. 5 illustrates a flowchart of a method for determining a trajectory of a robot's end effector according to an embodiment of the subject matter.

FIG. 5 illustrates a flowchart of a method for determining a trajectory of a robot's end effector according to an embodiment of the subject matter. As shown in FIG. 5, first, at block 510, after a collision of the robot's end effector is detected and the collision force suffered by the end effector is detected by the collision force detecting apparatus 100, a force obtaining unit 210 in the trajectory determining apparatus 200 obtains the collision force suffered by the end effector from the collision force detecting apparatus 100. The operation in block 510 is similar to the operation of the force obtaining unit 210 described as above with reference to FIG. 2.

Then, at block 530, the trajectory determining unit 220 in the trajectory determining apparatus 200 determines a second trajectory of the end effector based on the obtained collision force of the end effector and a recorded first trajectory of the end effector. The operation in block 530 is similar to the operation of the trajectory determining unit 220 described as above with reference to FIG. 2.

Figure 6:
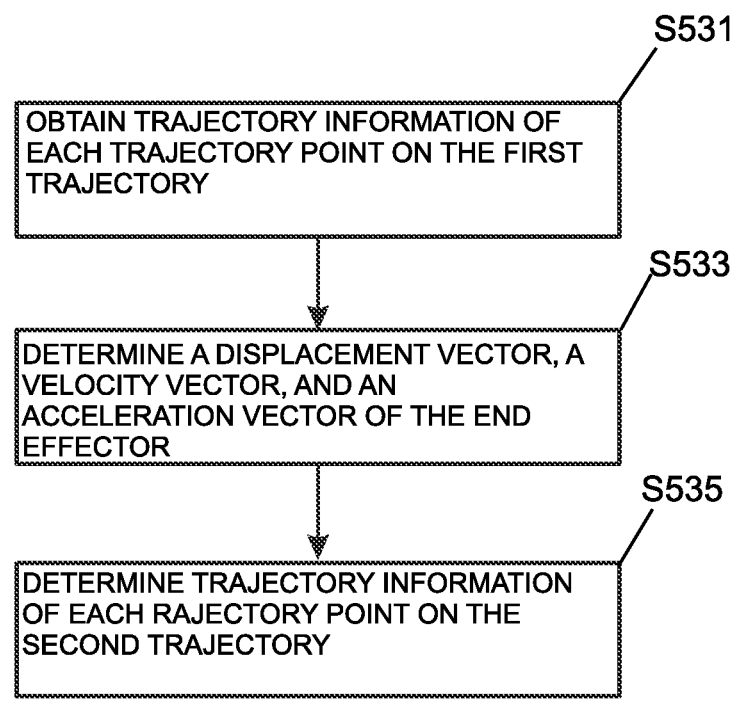
FIG. 6 illustrates a flowchart of an example process for determining a second trajectory of the end effector based on the obtained collision force and the recorded first trajectory of the end effector in FIG. 5.

FIG. 6 illustrates a flowchart of an example process for determining a second trajectory of the end effector based on the obtained collision force and the recorded first trajectory of the end effector in FIG. 5.

As shown in FIG. 6, at block 531, the trajectory information of each discrete trajectory point on the recorded first trajectory is obtained. The operation of block 531 is similar to the operation of the obtaining module 221 described with reference to FIG. 3.

At block 533, the trajectory information (i.e., the displacement vector, the velocity vector, and the acceleration vector) of the end effector caused by the collision force is determined using an impedance control model, based on the obtained impact force. The operation of block 533 is similar to the operation of the first determining module 223 described as above with reference to FIG. 3.

At block 535, the trajectory information of each discrete trajectory point $P_{1'}, P_{2'}, \ldots, P_{N'}$ of the second trajectory is determined based on the obtained trajectory information of each discrete trajectory points $P_1, P_2, \ldots, P_M$ on the first trajectory and the determined trajectory information of end effector corresponding to the collision force. The operation of block 535 is similar to the operation of the second determining module 225 described as above with reference to FIG. 3.

In addition, alternatively, after the second trajectory of the end effector is determined as above, at block S550, the end effector is controlled to move based on the determined second trajectory. Additionally, in another example, when the second trajectory is composed of discrete trajectory points, controlling the end effector to move based on the determined second trajectory may comprise: after the trajectory information of each discrete trajectory point on the second trajectory are determined, controlling the end effector to move according to the determined trajectory information of the discrete trajectory point on the second trajectory.

Embodiments of a method, apparatus, and system for determining a trajectory of a robot's end effector according to the present disclosure have been described as above with reference to FIGS. 1 to 6. The above trajectory determining apparatus may be implemented in hardware, software or a combination of hardware and software.

Figure 7:
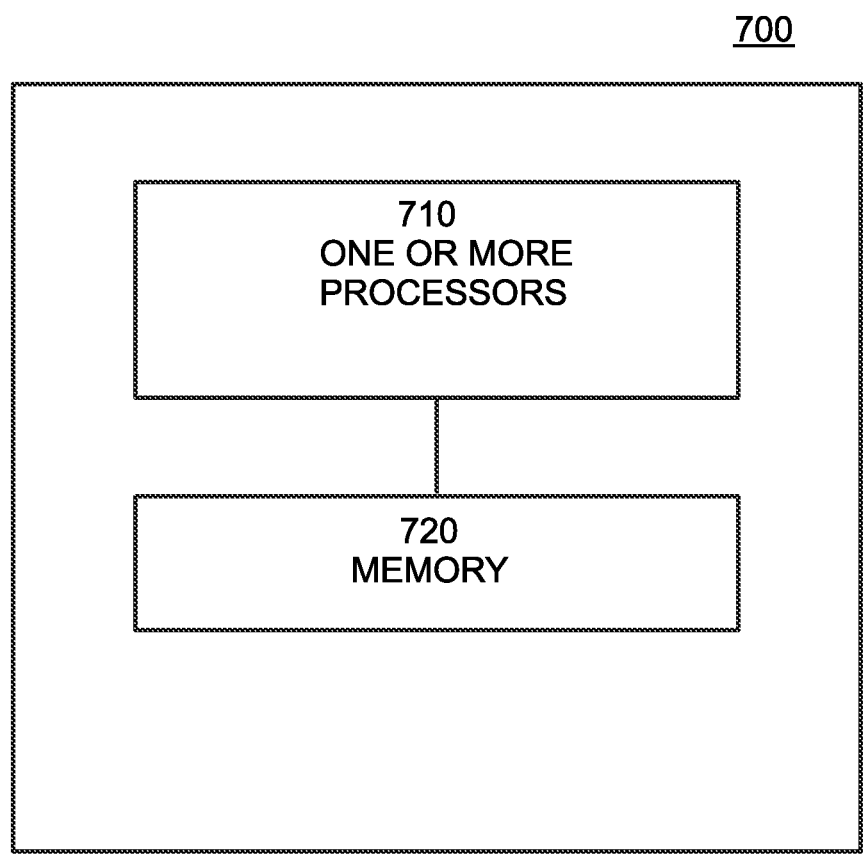
FIG. 7 illustrates a block diagram of a computer device for determining a trajectory of a robot's end effector according to an embodiment of the subject matter.

In the present disclosure, the trajectory determining apparatus 200 may be implemented using a computing device. FIG. 7 illustrates a block diagram of a computer device 700 for determining a trajectory of a robot's end effector according to an embodiment of the subject matter. According to one embodiment, the computing device 700 may include one or more processors 710 that executes one or more computer-readable instructions (i.e., the above elements implemented in software) stored or encoded in a computer-readable storage medium (i.e., memory 720).

In an embodiment, the computer-executable instructions stored in the memory 720, when executed, may cause the one or more processors to: obtain a collision force of a robot's end effector caused by a collision of the end effector when the collision is detected; and determine a second trajectory of the end effector based on the obtained collision force of the end effector and a recorded first trajectory of the end effector, and wherein the first trajectory is a trajectory before the collision, and the second trajectory is a trajectory after the collision.

It should be appreciated that the computer-executable instructions stored in the memory 720, when executed, may cause the one or more processors 710 to perform the respective operations or functions as described above with reference to FIGS. 1 to 6 in various embodiments of the subject matter.

According to an embodiment, a program product such as a non-transitory machine-readable medium is provided. The machine-readable medium may have instructions (i.e., the above elements implemented in software) thereon which, when executed by a machine, cause the machine to perform the operations or functions as described above with reference to FIGS. 1 to 6 in various embodiments of the subject matter. Specifically, a system or apparatus configured with a readable storage medium may be provided, and a software program code for realizing the functions of any of the above embodiments may be stored on the readable storage medium and may be read out and executed by the machine.

In this case, the program code itself read from the readable storage medium may realize the functions of any of the above embodiments, and thus the machine readable code and the readable storage medium storing the machine readable code form part of the present disclosure.

Examples of the readable storage media may include floppy disks, hard disks, magneto-optical disks, optical disks (such as CD-ROM, CD-R, CD-RW, DVD-ROM, DVD-RAM, DVD-RW, DVD-RW), magnetic tape, non-volatile memory card, and ROM. Alternatively, a program code may be downloaded from a server computer or cloud via a communication network.

It should be noted that not all steps and units in the above-mentioned processes and system architecture diagrams are necessary, and certain steps or units may be omitted as needed. The execution order of each step is not fixed and may be adjusted as needed. The structures of the apparatus described in the foregoing embodiments may be physical structures or logical structures, that is, some units may be implemented by the same physical entity, or some units may be implemented by a plurality of different physical entities, respectively, or may be implemented by some components of a plurality of standalone device together.

In the above embodiments, the hardware unit or module may be implemented by mechanical or electrical device(s). For example, a hardware unit, module, or processor may include a permanently dedicated circuitry or logic (e.g., a specialized processor, FPGA, or ASIC) to perform the corresponding operations. A hardware unit or processor may also include a programmable logic or circuitry (such as a general-purpose processor or other programmable processor) that may be temporarily set by software to perform the corresponding operations. Specific implementations (mechanical, or dedicated, permanent circuits, or temporarily set up circuits) may be determined based on cost and time considerations.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for determining a trajectory of an end effector of a robot, comprising:
   a force obtaining device configured to obtain a collision force of the end effector of the robot, wherein the collision force is caused by a collision of the end effector upon the collision being detected and the end effector is modeled as an impedance control model;
   a recording device configured to record trajectory information of a first trajectory of the end effector before the collision, the first trajectory including a plurality of discrete trajectory points; and
   a trajectory determining device including
      an obtaining module configured to obtain trajectory information of each discrete trajectory point of the plurality of discrete trajectory points on the recorded first trajectory;
      a first determining module configured to determine a displacement vector, a velocity vector and an acceleration vector of the end effector caused by the collision force using the impedance control model, based on the collision force obtained, and
      a second determining module configured to
         obtain an inverse discrete trajectory point arrangement of the first trajectory by inversely arranging the plurality of discrete trajectory points on the first trajectory,
         determine a second trajectory of the end effector using the impedance control model, based on the collision force of the end effector obtained and the recorded first trajectory of the end effector, by determining trajectory information of each discrete trajectory point on the second trajectory, the trajectory information of each discrete trajectory point on the second trajectory based on
            the trajectory information of each discrete trajectory point on the first trajectory obtained,
            the trajectory information of each discrete trajectory point in the inverse discrete trajectory point arrangement,
            the displacement vector of the end effector,
            the velocity vector of the end effector, and
            the acceleration vector of the end effector,
            the displacement vector, the velocity vector, and the acceleration vector of the end effector being caused by the collision force, and
         determine a velocity value and an acceleration value of each other trajectory point of the second trajectory, other than the end trajectory point, according to a formula:

$$V'_i = \begin{cases} \left(\frac{|\dot{X}|}{i} + |\dot{X}_{M-i+1}|\right) & \left(\frac{|\dot{X}|}{i} + |\dot{X}_{M-i+1}|\right) < V_{limit} \\ V_{limit} & \left(\frac{|\dot{X}|}{i} + |\dot{X}_{M-i+1}|\right) \geq V_{limit} \end{cases}, \text{and}$$

$$A'_i = \begin{cases} \left(\frac{|\ddot{X}|}{i} + |\ddot{X}_{M-i+1}|\right) & \left(\frac{|\ddot{X}|}{i} + |\ddot{X}_{M-i+1}|\right) < A_{limit} \\ A_{limit} & \left(\frac{|\ddot{X}|}{i} + |\ddot{X}_{M-i+1}|\right) \geq A_{limit} \end{cases},$$

wherein $V_{limit}$ is a velocity threshold, and $A_{limit}$ is an acceleration threshold, wherein each respective trajectory point, of a plurality of trajectory points of the trajectory, includes trajectory information including a position vector, a velocity vector of each respective trajectory point, and an acceleration vector of each respective trajectory point, and wherein the impedance control model is $f_{collision} = M\ddot{X} + B\dot{X} + KX$, where $f_{collation}$ is a collision force of the end effector caused by the collision, X is a displacement vector of the end effector caused by the collision force, $\dot{X}$ and $\ddot{X}$ are the velocity vector and the acceleration vector of the end effector caused by the collision force, respectively, M is an inertia matrix of the end effector, B is a damping matrix of the end effector, and K is a stiffness matrix of the end effector.

2. The apparatus of claim 1, further comprising:
a configuring device configured to configure the inertia matrix, the damping matrix, and the stiffness matrix of the end effector under the impedance control model.

3. The apparatus of claim 1,
wherein a trajectory distance between the end trajectory point and a start trajectory point of the second trajectory is relatively closest to a displacement distance of the end effector caused by the collision force, and wherein a position vector of each discrete trajectory point is determined to be the same as the position vector of a corresponding discrete trajectory point in a reverse discrete trajectory point arrangement, directions of a velocity vector and an acceleration vector of each discrete trajectory point on the second trajectory are determined to be opposite to directions of a velocity vector and an acceleration vector of a corresponding discrete trajectory point in the reverse discrete trajectory point arrangement, and a velocity vector and an acceleration vector of the end trajectory point of the second trajectory are set to zero $$V'_i = \begin{cases} \left(\frac{|\dot{X}|}{i} + |\dot{X}_{M-i+1}|\right) & \left(\frac{|\dot{X}|}{i} + |\dot{X}_{m-i+1}|\right) < V_{limit} \\ V_{limit} & \left(\frac{|\dot{X}|}{i} + |\dot{X}_{M-i+1}|\right) \geq V_{limit} \end{cases}$$

$$A'_i = \begin{cases} \left(\frac{|\ddot{X}|}{i} + |\ddot{X}_{M-i+1}|\right) & \left(\frac{|\ddot{X}|}{i} + |\ddot{X}_{M-i+1}|\right) < A_{limit} \\ A_{limit} & \left(\frac{|\ddot{X}|}{i} + |\ddot{X}_{M-i+1}|\right) \geq A_{limit} \end{cases}$$

$V_{limit}$ $A_{limit}$.

4. A system for determining a trajectory of an end effector of a robot, comprising:
   a collision force detecting apparatus configured to detect the collision force of the end effector of the robot caused by the collision of the end effector; and
   the apparatus of claim 1.

5. An apparatus for determining a trajectory of an end effector of a robot, comprising:
   one or more processors; and
   a memory coupled to the one or more processors, for storing computer-executable instructions that, when executed, cause the one or more processors to cause the apparatus to
   obtain a collision force of the end effector of the robot, wherein the collision force is caused by a collision of the end effector upon the collision being detected and the end effector is modeled as an impedance control model,
   record trajectory information of a first trajectory of the end effector before the collision, the first trajectory including a plurality of discrete trajectory points,
   obtain trajectory information of each discrete trajectory point of the plurality of discrete trajectory points on the recorded first trajectory,
   determine a displacement vector, a velocity vector and an acceleration vector of the end effector caused by the collision force using the impedance control model, based on the collision force obtained,
   obtain an inverse discrete trajectory point arrangement of the first trajectory by inversely arranging the plurality of discrete trajectory points on the first trajectory,
   determine a second trajectory of the end effector using the impedance control model, based on the collision force of the end effector obtained and the recorded first trajectory of the end effector, by determining trajectory information of each discrete trajectory point on the second trajectory, the trajectory information of each discrete trajectory point on the second trajectory based on
      the trajectory information of each discrete trajectory point on the first trajectory obtained,
      the trajectory information of each discrete trajectory point in the inverse discrete trajectory point arrangement,
      the displacement vector of the end effector,
      the velocity vector of the end effector, and
      the acceleration vector of the end effector,
      the displacement vector, the velocity vector, and the acceleration vector of the end effector being caused by the collision force, and
   determine a velocity value and an acceleration value of each other trajectory point of the second trajectory, other than the end trajectory point, according to a formula:

$$V'_i = \begin{cases} \left(\frac{|\dot{X}|}{i} + |\dot{X}_{M-i+1}|\right) & \left(\frac{|\dot{X}|}{i} + |\dot{X}_{M-i+1}|\right) < V_{limit} \\ V_{limit} & \left(\frac{|\dot{X}|}{i} + |\dot{X}_{M-i+1}|\right) \geq V_{limit} \end{cases}, \text{ and}$$

$$A'_i = \begin{cases} \left(\frac{|\ddot{X}|}{i} + |\ddot{X}_{M-i+1}|\right) & \left(\frac{|\ddot{X}|}{i} + |\ddot{X}_{M-i+1}|\right) < A_{limit} \\ A_{limit} & \left(\frac{|\ddot{X}|}{i} + |\ddot{X}_{M-i+1}|\right) \geq A_{limit} \end{cases},$$

wherein $V_{limit}$ is a velocity threshold, and $A_{limit}$ is an acceleration threshold,
   wherein each respective trajectory point, of a plurality of trajectory points of the trajectory, includes trajectory information including a position vector, a velocity vector of each respective trajectory point, and an acceleration vector of each respective trajectory point, and
   wherein the impedance control model is $f_{collision} = M\ddot{X} + B\dot{X} + KX$, where $f_{collision}$ s a collision force of the end effector caused by the collision, X is a displacement vector of the end effector caused by the collision force, $\dot{X}$ and $\ddot{X}$ are the velocity vector and the acceleration vector of the end effector caused by the collision force, respectively, M is an inertia matrix of the end effector, B is a damping matrix of the end effector, and K is a stiffness matrix of the end effector.

6. The apparatus of claim 5, wherein the one or more processors are further configured to cause the apparatus to configure the inertia matrix, the damping matrix, and the stiffness matrix of the end effector under the impedance control model.

7. A system for determining a trajectory of an end effector of a robot, comprising:
   a collision force detector configured to detect the collision force of the end effector of the robot caused by the collision of the end effector upon the collision being detected; and
   the apparatus of claim 5.

\* \* \* \* \*